United States Patent [19]
van der Meer et al.

[11] Patent Number: 5,541,244
[45] Date of Patent: Jul. 30, 1996

[54] POLYMER MIXTURE AND ARTICLES FORMED THEREFROM

[75] Inventors: Roelof van der Meer, Halsteren; Constantinus L. J. A. Verbraak, Steenbergen; Jan W. Heuseveldt; Johannes van Helmond, both of Bergen op Zoom; Hendrikus H. T. M. Ketels, Huybergen, all of Netherlands

[73] Assignee: General Electric Company, Pittsfield, Mass.

[21] Appl. No.: 541,736

[22] Filed: Oct. 10, 1995

Related U.S. Application Data

[63] Continuation of Ser. No. 179,855, Jan. 11, 1994, abandoned.

[30] Foreign Application Priority Data

Feb. 1, 1993 [NL] Netherlands ............................ 9300194

[51] Int. Cl.⁶ ............................ C08K 5/52; C08L 53/00; C08F 283/04; C08G 69/48
[52] U.S. Cl. ........................ 524/140; 525/425; 525/440; 525/445; 525/902; 525/88
[58] Field of Search ................................... 524/140, 505, 524/539, 415; 525/92, 173, 177, 425, 439, 440, 445, 902, 88, 191

[56] References Cited

U.S. PATENT DOCUMENTS

| | | | |
|---|---|---|---|
| 3,953,539 | 4/1976 | Kawase et al. | 260/860 |
| 5,162,424 | 11/1992 | de Boer | 524/505 |
| 5,202,385 | 4/1993 | Bailly et al. | 525/425 |
| 5,252,653 | 10/1993 | van Helmond | 524/409 |

FOREIGN PATENT DOCUMENTS

| | | |
|---|---|---|
| 0078238 | 5/1983 | European Pat. Off. . |
| 0264143 | 4/1988 | European Pat. Off. . |
| 2316283 | 3/1977 | France . |
| 1060401 | 3/1967 | United Kingdom . |

*Primary Examiner*—Paul R. Michl
*Assistant Examiner*—LaVonda R. DeWitt

[57] ABSTRACT

The invention relates to polymer mixtures comprising a first polyalkylene phthalate and a second polyalkylene phthalate and/or a thermoplastic elastomer. Certain compounds, namely phosphates, have been found to be good transesterification inhibitors. An important advantage of the said inhibitors is that they do not condense, or hardly condense, to polyphosphates and that they do not negatively influence the impact strength of the polymer mixture.

6 Claims, No Drawings

POLYMER MIXTURE AND ARTICLES FORMED THEREFROM

This is a continuation of application Ser. No. 08/179,855 filed on Jan. 11, 1994, now abandoned.

The invention relates to a polymer mixture comprising

A) a first polyalkylene phthalate

B) B1 a second polyalkylene phthalate which is not equal to the first polyalkylene phthalate; or B2 a thermoplastic elastomer selected from a polyether ester block copolymer, a polyester ester urethane and a polyether imide ester; or B3 a mixture of B1 and B2, and C) a transesterification inhibitor.

The invention also relates to articles formed from the polymer mixture according to the invention.

The use of transesterification inhibitors in polymer mixtures is known per se. U.S. Pat. No. 3,953,539, for example, discloses polymer mixtures which comprise a polyalkylene phthalate, an aromatic polycarbonate and a transesterification inhibitor. According to U.S. Pat. No. 3,953,539, for example, the salts of a large number of different metals with phosphorus acids may be used. As specific examples are mentioned salts of sodium, calcium, aluminium, potassium and magnesium.

GB 1,060,401 discloses a method of preparing stable compositions of block copolyesters or of polyester mixtures having at least two polyesters. A phosphorus compound is added to the compositions in order to avoid or delay ester interchange. A large number of phosphorus compounds is mentioned, including inorganic phosphorus compounds, for example, diammonium hydrogen phosphate, ammonium dihydrogen phosphate, magnesium hydrogen phosphate and manganese hydrogen phosphate. The hydrogen phosphates just mentioned have for their disadvantage that they negatively influence the mechanical properties, for example, the tensile strength and the impact strength. The thermal properties, for example, HDT (heat deflection temperature) and Vicat value are also negatively influenced.

The invention provides the use of other hydrogen phosphates which do not have the disadvantages mentioned hereinbefore or have these to a much smaller extent.

A zinc or calcium hydrogen phosphate is used as a transesterification inhibitor in the polymer mixture according to the invention. Suitable hydrogen phosphates are zinc-bis-(dihydrogen phosphate) and calcium-bis-(dihydrogen phosphate).

According to EP-A-92116872, filed on Oct. 2, 1992, the hydrogen phosphates just mentioned hereinbefore are used as transesterification inhibitors of polymer mixtures based on a polyalkylene phthalate and an aromatic polycarbonate.

The polymer mixture according to the invention comprises at any rate one or more of the following constituents:

A) a first polyalkylene phthalate and

B) B1 a second polyalkylene phthalate which is not equal to the first polyalkylene phthalate; or B2 a thermoplastic elastomer selected from a polyether ester block copolymer, a polyester ester urethane or a polyether imide ester; or B3 a mixture of B1 and B2, and C) a hydrogen phosphate of zinc or calcium as a transesterification inhibitor.

In addition to the constituents mentioned hereinbefore, the polymer mixture may comprise conventional additives. By way of example may be mentioned in particular polymeric additives to improve the impact strength, flame-retardant additives, reinforcing and non-reinforcing fillers, oxidation stabilisers, mould-release agents, processing additives, dyes and/or pigments. In addition, the polymer mixture—particularly when it comprises a flame-retardant additive, for example, a brominated aromatic carbonate, oligomer, polymer or copolymer—may also comprise antimony oxide as an auxiliary substance.

The weight ratio of constituent A to constituent B in the polymer mixture according to the invention preferably lies between 5: 95 and 95: 5.

In the polymer mixture according to the invention constituent A may, for example, be a polybutylene terephthalate and constituent B may comprise a polyethylene terephthalate or a mixture of a polyethylene terephthalate and a thermoplastic elastomer, for example, a polyether ester block copolymer.

A) Polyalkylene Phthalate

The polymer mixture comprises at any rate one (the first) polyalkylene phthalate and optionally a second polyalkylene phthalate (the second). Polyalkylene phthalates are polymers having units derived from an alkanediol and an aromatic dicarboxylic acid. The polyalkylene phthalate may comprise units derived from one or more alkanediol compounds. The polyalkylene phthalate also comprises units derived from one or more aromatic dicarboxylic acids. In addition to the alkanediol the polyalkylene phthalate may comprise units derived from one or more other diol compounds or polyol compounds.

Polyalkylene phthalates generally comprise an excess of units derived from an alkanediol with respect to the optionally present units derived from other diol compounds or polyol compounds.

Suitable alkanediol compounds are, for example, ethanediol or butane-1,4-diol. In addition to units derived from aromatic dicarboxylic acids, the polyalkylene phthalate may also comprise units derived from other dicarboxylic acids or polycarboxylic acids. However, the greater part of the units derived from acids is preferably derived from an aromatic dicarboxylic acid. Suitable aromatic dicarboxylic acids are terephthalic acid and isophthalic acid, preferably terephthalic acid.

As a polyalkylene phthalate is preferably used a polyalkylene phthalate having more than 70 mol. % of units derived from terephthalic acid and ethanediol or butane-1, 4-diol. It is also possible to use a mixture of one or more different polyalkylene phthalates.

B) Constituent B

The polymer mixture according to the invention comprises as constituent B a second polyalkylene phthalate which is not equal to the first polyalkylene phthalate (B1) or a thermoplastic elastomer selected from a polyether ester block copolymer, a polyester ester urethane and a polyether imide ester (B2) or a mixture of B1 and B2 (B3).

The second polyalkylene phthalate meets with the general description as given hereinbefore for constituent A. However, the first and the second polyalkylene phthalates are not identical.

Polyether ester block copolymers are generally obtained by condensation polymerisation of one or more dicarboxylic acids, one or more long-chain glycols and one or more short-chain glycols.

Examples of suitable polyether-ester block copolymers are described in DE-C-2338615 and DE-B-2460258, as well as in the literature references cited therein.

As a polyester-ester urethane is preferably used a block copolymer which is built up from polyester-ester units which are bonded by means of groups of the formula $R_1[NHC(O)]_p$, wherein $R_1$ is a polyfunctional group having at most 30 carbon atoms and p has a value of 2 or 3. The polyester-ester units are built up from blocks having a number of ester units of the formula—$OGOC(O)R_2C(O)$— and blocks having a number of ester units which are capable of forming a bifunctional polyester or polyester amide having a melting-point of less than 100° C. These blocks are bonded together by ester bonds, in which at least 80 mol.% of the $R_2$ groups are 1,4-phenylene radicals and in which at least 80 mol.% of the G-groups are a tetramethylene group.

Such polymers and their mode of preparation are described, for example, in EP-A-0102115, U.S. Pat. No. 4,186,257 and U.S. Pat. No. 4,228,249.

As a polyether imide ester is preferably used a block copolymer which has been obtained by reaction of a diol of low molecular weight, a dicarboxylic acid, a poly(oxyalkylene) diamine and a tricarboxylic acid or a derivative thereof.

Such polymers are described, for example, in U.S. Pat. No. 4,544,734, U.S. Pat. No. 4,556,705 and U.S. Pat. No. 4,556,688.

C. Transesterification Inhibitor

The polymer mixture according to the invention comprises as a transesterification inhibitor a hydrogen phosphate, for example, zinc or calcium (monohydrogen phosphate) or zinc or calcium-bis(dihydrogen phosphate). The use of these inhibitors provides the following advantages: a good suppression of the transesterification; no or hardly any influence on the action of polymeric constituents for improving the impact strength when they are present in the polymer mixture (this in contrast with zinc orthophosphate); the inhibitor used is a solid and can hence be compounded in an extruder more easily than other known liquid inhibitors, for example, phosphoric acid and phosphorus acid; no discoloring (yellowing) of the polymer mixture such as this occurs when phosphoric acid is used and no gray-colouring when antimony oxide is present (this does occur when phosphorus acid is used as an inhibitor). In comparison with sodium dihydrogen phosphate the inhibitor as used in the polymer mixture according to the invention provides the important advantage that polycondensation of the phosphate does not occur and hence no deposits or a much smaller quantity of deposits occur during the extrusion or the injection-moulding. Constituent C is preferably used in a quantity from 0.01 to 2 parts by weight per 100 parts by weight of A plus B.

In addition to the constituents mentioned hereinbefore, the polymer mixture according to the invention may comprise any constituents conventionally used for such polymer mixtures. In particular may be mentioned the polymers which are generally known for improving the impact strength. To be considered in the first instance are copolymers and graft copolymers which comprise rubber-like constituents. Examples are the core-shell graft polymers having a rubber-like core on which one or more monomers have been grafted.

Examples of further suitable constituents for the polymer mixture according to the invention are the following: flame-retardant additives, reinforcing and non-reinforcing fillers, oxidation stabilisers, mould-release agents, processing additives, dyes and/or pigments.

The invention will be described in greater detail with reference to the ensuing specific examples.

In the examples hereinafter the following constituents are used:

| | |
|---|---|
| PBT: | a polybutylene terephthalate having an intrinsic viscosity of approximately 0.70 ml/g measured in a phenol-(1,1,2,2-tetrachloroethane) mixture (60:40) at 25° C. |
| PET: | a polyethylene terephthalate having a weight-averaged molecular weight of approximately 90,000. |
| TPE: | a polyether ester block copolymer having 44% by weight of polyether blocks and 56% by weight of polyester units. The polyether blocks are built-up units derived from polytetramethylene glycol and polyethylene glycol in a weight ratio of 85:15. The ester units are derived from butanediol, hexanediol and terephthalic acid. Molar ratio butanediol to hexanediol is 70:30. |
| ABS: | A graft polymer obtained by grafting approximately 8 parts by weight of acrylonitrile and 22 parts by weight of styrene on a butadiene latex. Butadiene content approximately 70% by weight. |
| PE: | finely ground polyethylene. |
| Antioxidants 1-2: | two different auxiliary substances conventionally used for polyalkylene terephthalates (hindered phenols). |
| UVA absorption agent: | a benzotriazole UV-absorption agent |
| Glass fibres: | glass fibres having a length from 3.5 to 5.5 millimeters. |
| Stab.: | Stabiliser to improve the hydrolytic stability. |

Comparative examples A and B, Examples I and II according to the invention

In these examples various polymer mixtures were prepared as is recorded in Table A hereinafter.

The constituents mentioned therein were compounded in an extruder (average adjusted temperature 280° C.), extruded and pelletised.

Standard test rods were injection-moulded from the resulting pellets to determine the impact strength accoding to Izod with and without notch (ASTM D 256), to determine the Heat Deflection Temperature (ASTM 248), the Softening Temperature according to Vicat (DIN 53460), the tensile strength (ASTM 638). The found results are also recorded in Table A. Injection moulding was carried out under normal conditions.

TABLE A

| Example | A | B | I | II |
|---|---|---|---|---|
| Composition (parts by weight) | | | | |
| PBT | 39 | 39 | 39 | 39 |
| PET | 38 | 38 | 38 | 38 |
| PE | 2 | 2 | 2 | 2 |
| Antioxidant-1 | 0.5 | 0.5 | 0.5 | 0.5 |
| UVA | 0.25 | 0.25 | 0.25 | 0.25 |
| Glass fibres | 20 | 20 | 20 | 20 |
| mono ammonium dihydrogen phosphate | — | 0.4 | — | — |
| mono zinc dihydrogen phosphate | — | — | 0.4 | — |
| mono calcium dihydrogen phosphate | — | — | — | 0.4 |
| Properties | | | | |
| Impact strength according to IZOD without notch | 590 | 200 | 390 | 380 |

TABLE A-continued

| Example | A | B | I | II |
|---|---|---|---|---|
| (J/m) | | | | |
| Impact strength according to Izod with notch (J/m) | 70 | 40 | 50 | 50 |
| Heat Deflection Temperature (°C.) | 210 | 173 | 211 | 206 |
| Vicat softening temperature (°C.) | 199 | 158 | 172 | 183 |
| Tensile strength (MPa) | 125 | 68 | 105 | 100 |

It may be seen from the results shown that the addition of hydrogen phosphates (examples B, I and II) always leads to a reduction of the tensile strength, the impact strength and the Vicat softening temperature; when the known monoammonium dihydrogen phosphate is used, a reduction of the heat deflection temperature also occurs. When the hydrogen phosphates according to the invention are used (examples I and II), the said reduction is much smaller than in comparative example B.

Differential scanning calorimetry (thermal analysis) has demonstrated that all three hydrogen phosphates readily suppress the transesterification in the concentration used.

Comparative Examples C and D, Example III

Various polymer mixtures were prepared as recorded in Table B. The following properties of the polymer mixtures were determined: impact strength, tensile strength and the bending modulus (according to ASTM D790).

In addition the melt volume index was determined (at 250° C.; according to ISO 1133), once after the sample had been kept in the test apparatus at 250° C. for four minutes, and once after it had been kept at the same temperature for fifteen minutes.

The results are also recorded in Table B.

TABLE B

| Example | C | D | III |
|---|---|---|---|
| Composition (parts by weight) | | | |
| TPE | 45.8 | 45.6 | 45.6 |
| PBT | 45 | 45 | 45 |
| ABS | 5 | 5 | 5 |
| Stab | 1.2 | 1.2 | 1.2 |
| Anti-oxidant-2 | 1 | 1 | 1 |
| Mono zinc dihydrogen phosphate | — | — | 0.2 |
| Mono ammonium dihydrogen phosphate | — | 0.2 | — |
| Carbon black | 2 | 2 | 2 |
| Properties | | | |
| Impact strength according to Izod with notch −10° C. (J/m) | 600 | 410 | 400 |
| Tensile strength (MPa) | 20 | 20 | 20 |
| Bending modulus (MPa) | 670 | 670 | 670 |
| Melt volume index | | | |

TABLE B-continued

| Example | C | D | III |
|---|---|---|---|
| (250° C.; 1.20 kg) ($cm^3$ per 10 min.) | | | |
| after 4 minutes at 250° C. | 24.4 | 24.8 | 25.8 |
| after 15 minutes at 250° C. | 24.8 | 31.0 | 27.6 |

It may be seen from the above results that the addition of hydrogen phosphates always leads to a reduction of the impact strength. This corresponds with the results in the examples B, I and II. The remaining mechanical properties remain the same in examples C, D and III.

The melt volume index (measurements with different residence times) demonstrates that both hydrogen phosphates in the concentration used readily suppress the transesterification.

When the known mono ammonium dihydrogen phosphate is used, however, a faster degradation of the polymer occurs than when mono zinc dihydrogen phosphate is used.

We claim:

1. A polymer mixture consisting essentially of:
   A) a first polyalkylene phthalate, and
   B) a component selected from the group consisting of:
      B1) a second polyalkylene phthalate which is not equal to the first polyalkylene phthalate; B2) a thermoplastic elastomer selected from a polyether ester block copolymer, a polyester ester urethane and a polyether imide ester; and B3) a mixture of B1 and B2, wherein the weight ratio of constituent A to constituent B lies between 5:95 and 95:5, and
   C) mono zinc dihydrogen phosphate as a transesterification inhibitor being present in an amount from 0.01 to 2 parts by weight per 100 parts by weight A and B, and
   D) a core-shell graft polymer for improving impact resistance.

2. A polymer mixture as claimed in claim 1, wherein the polymer mixture comprises a first and/or a second polyalkylene phthalate having more than 70 mol.% of units derived from terephthalic acid and ethanediol or butane-1,4-diol.

3. A polymer mixture as claimed in claim 1, wherein the first polyalkylene phthalate is polybutylene terephthalate and the second polyalkylene phthalate is polyethylene terephthalate.

4. A polymer mixture as claimed in claim 1, wherein the first polyalkylene phthalate is polybutylene terephthalate and constituent B2 is a polyether ester block copolymer.

5. A polymer mixture as claimed in claim 1, wherein the polymer mixture moreover comprises one or more of the following additives: flame-retardant additives, reinforcing and non-reinforcing fillers, oxidation stabilisers, mould release agents, processing additives, dyes and pigments.

6. Articles formed from the polymer mixture as claimed in claim 1.

* * * * *